Jan. 6, 1925.
L. R. STOWE
STOKER
Filed July 1, 1920
1,521,914
16 Sheets-Sheet 2
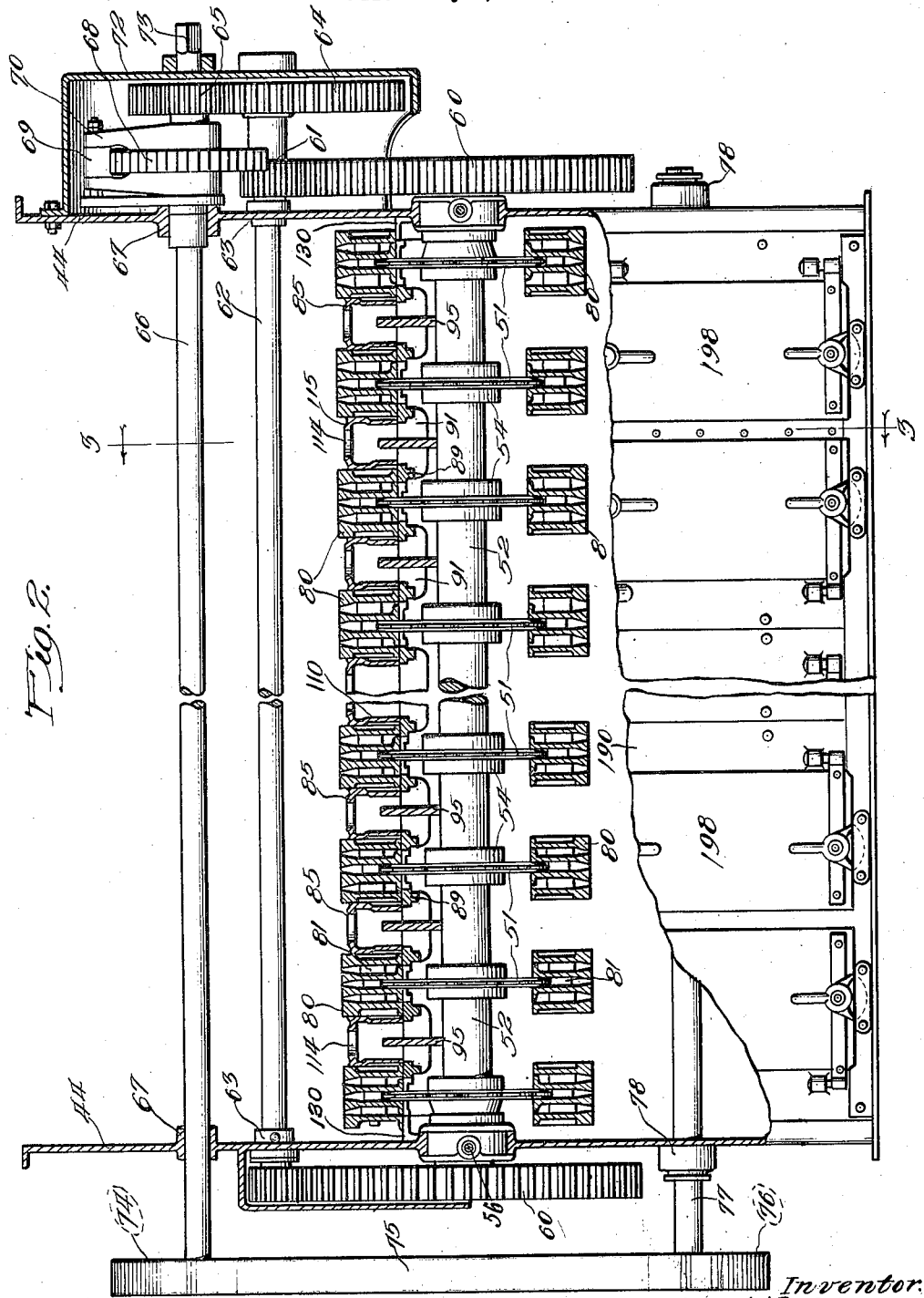
Inventor.
Loyd R. Stowe.

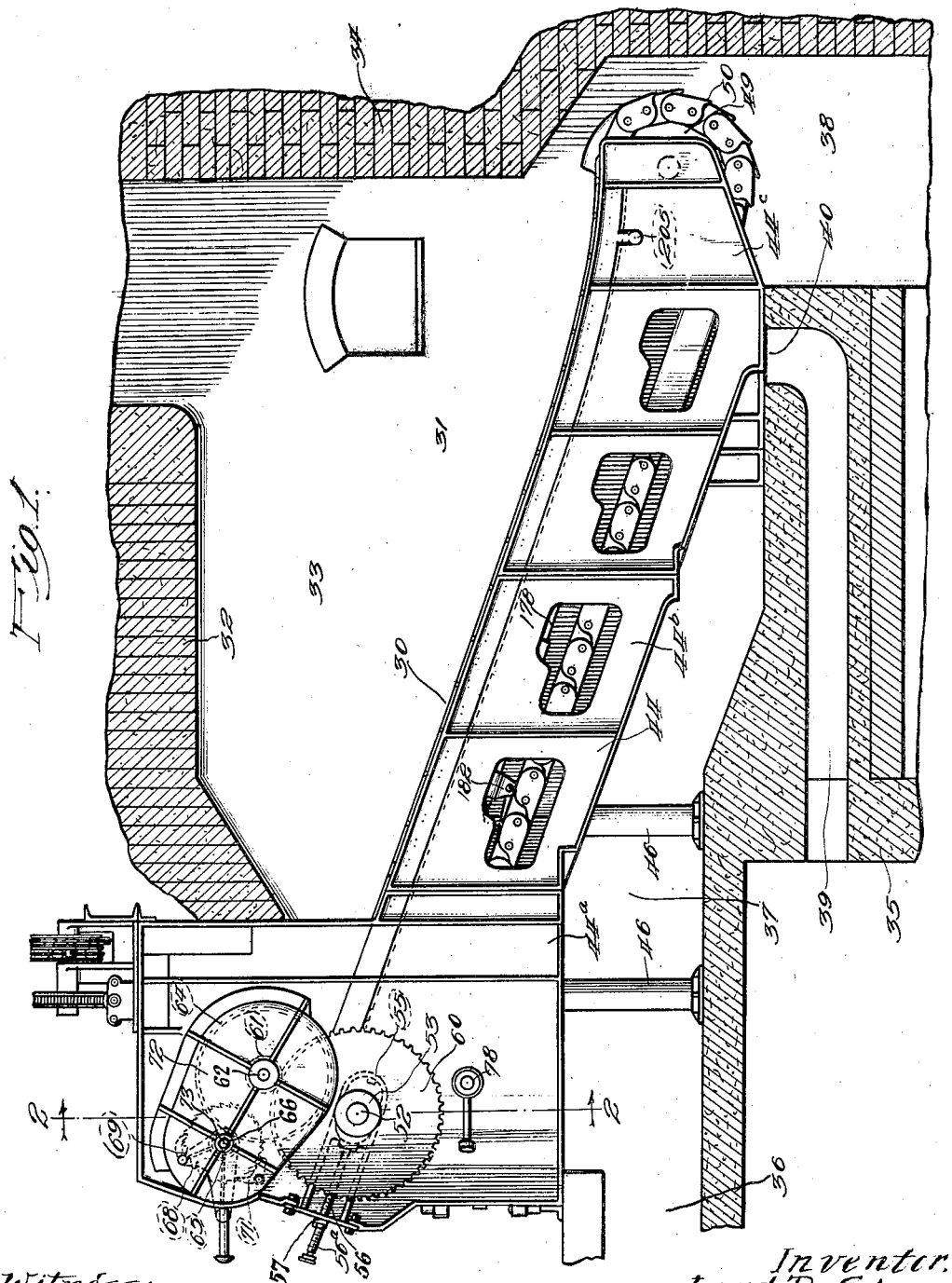

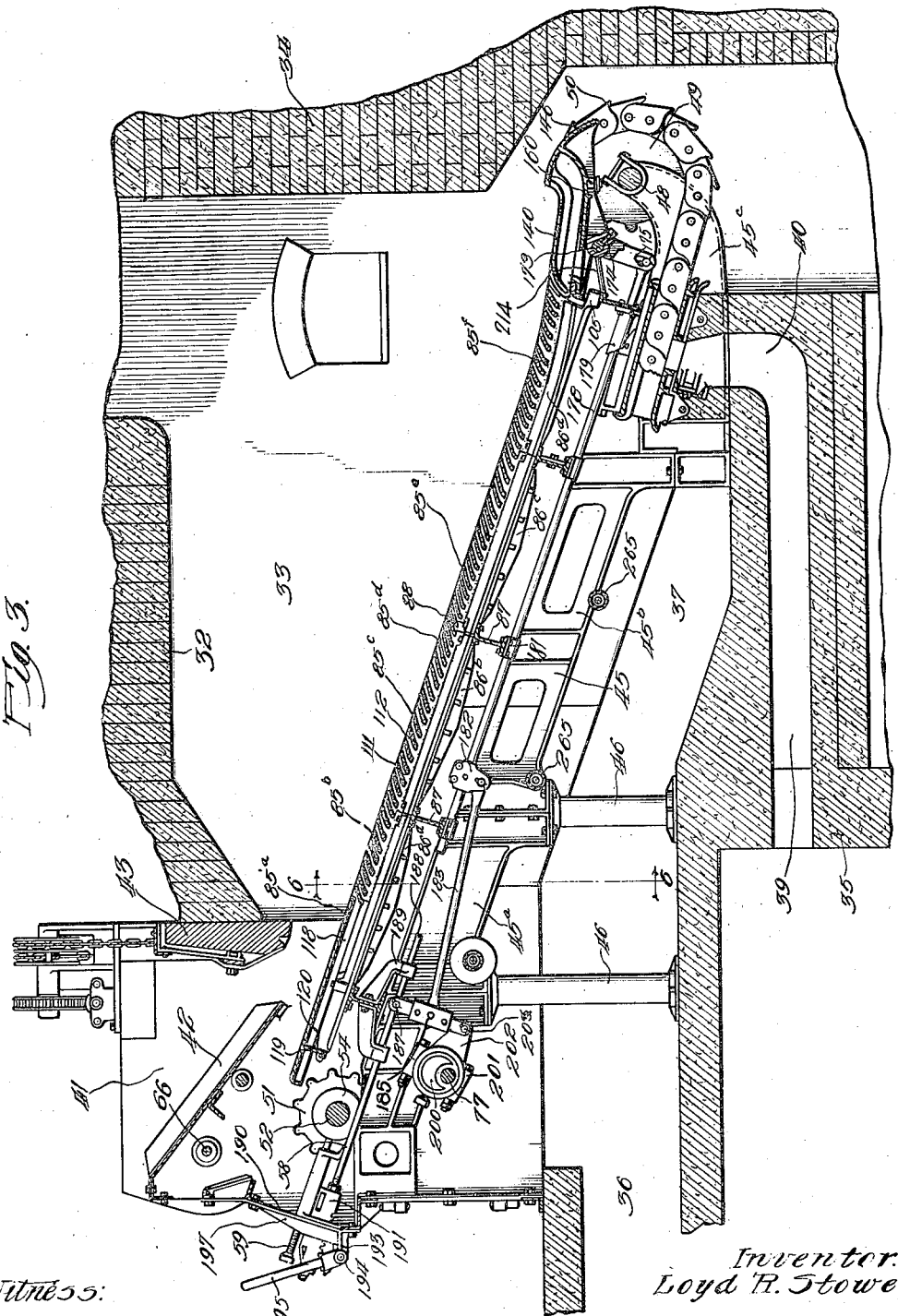

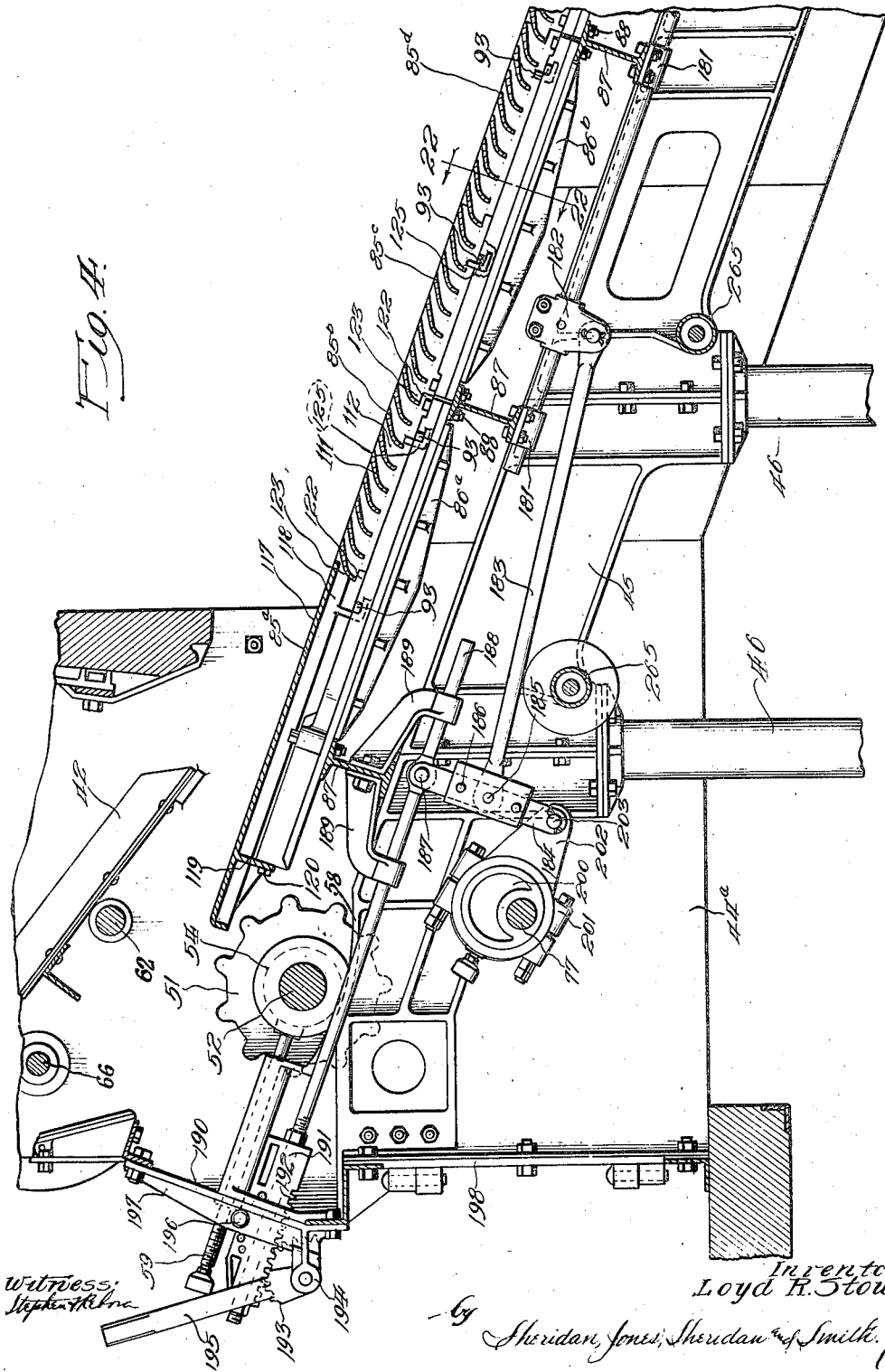

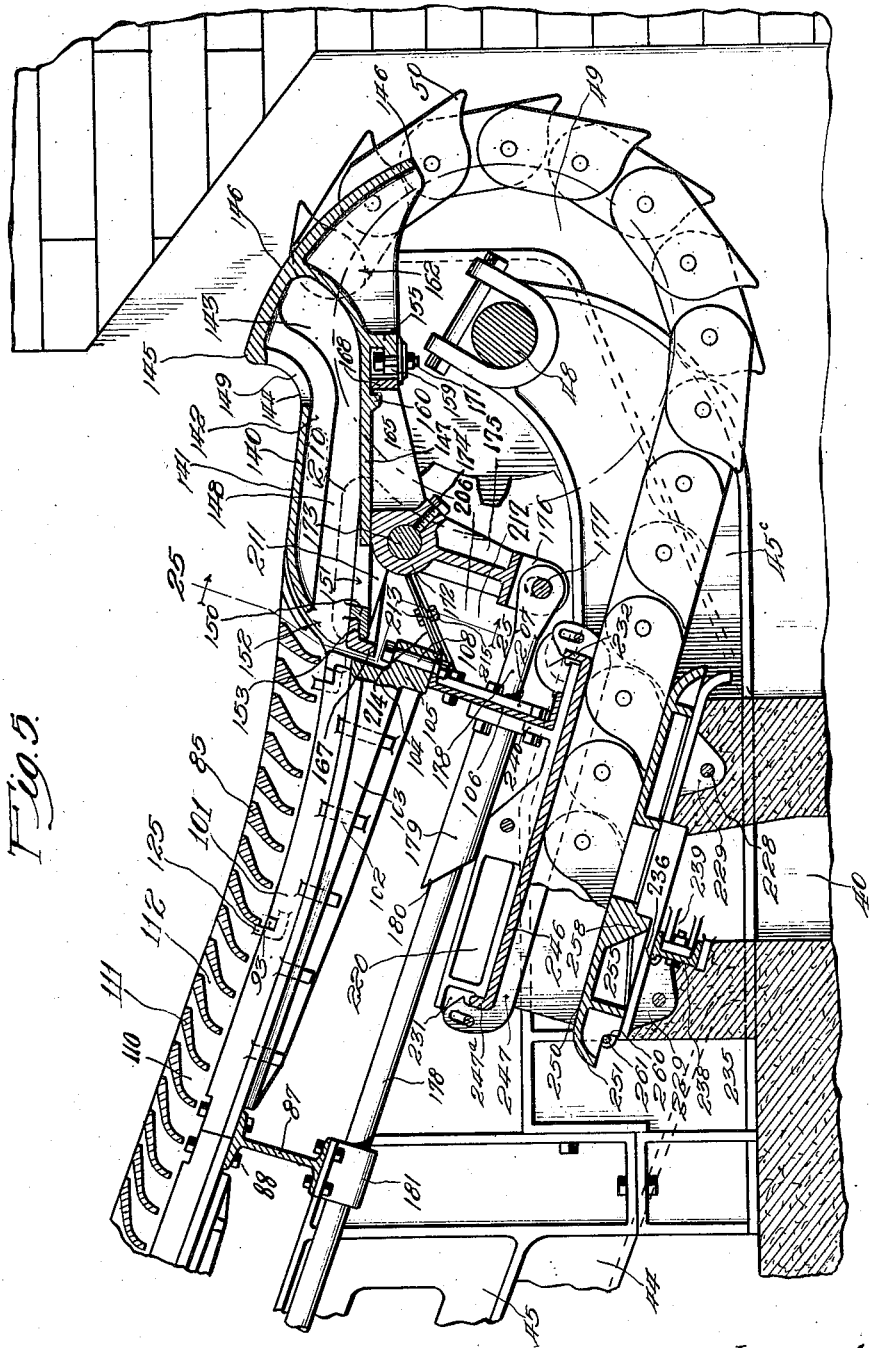

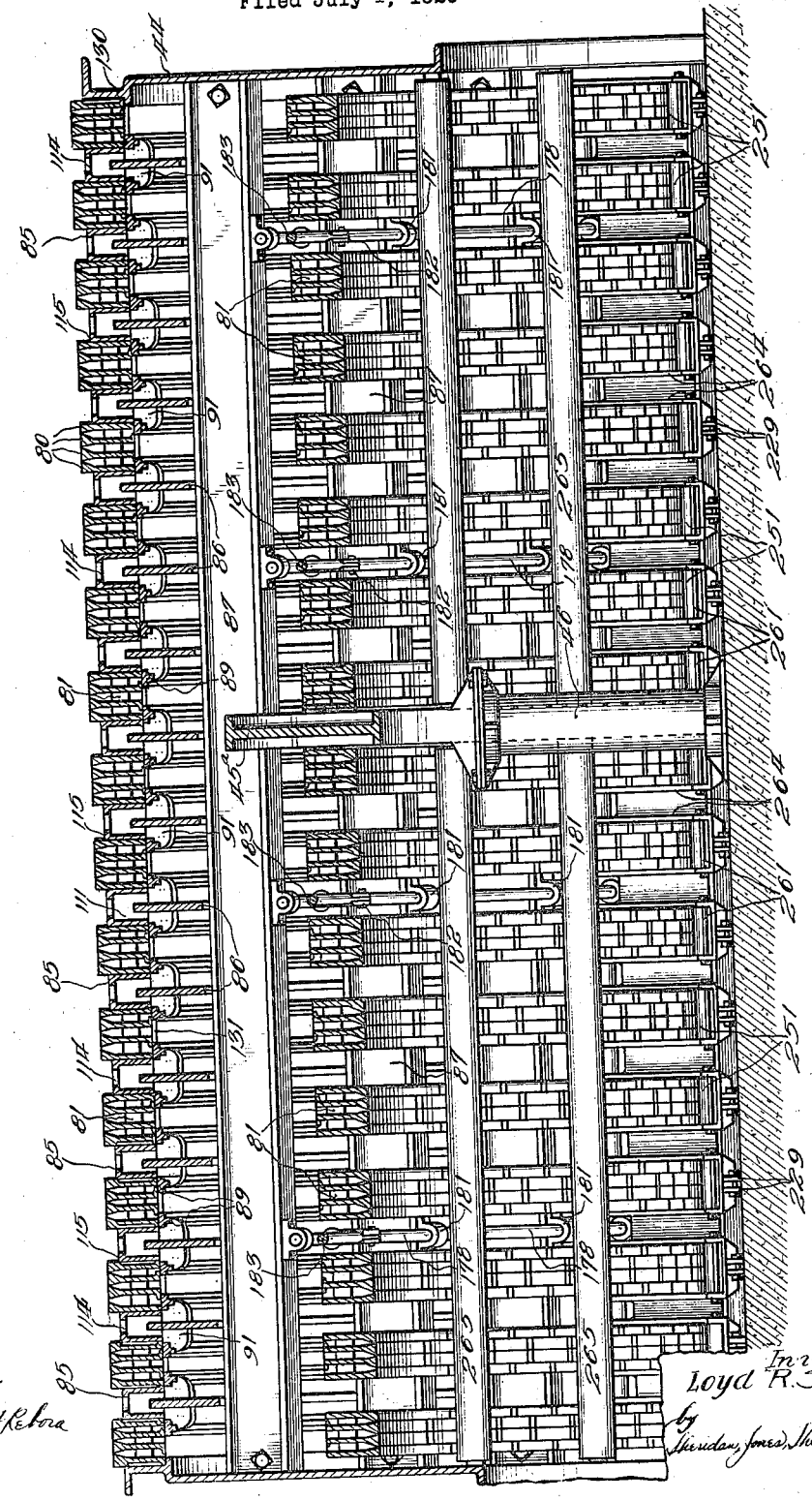

Jan. 6, 1925.
1,521,914
L. R. STOWE
STOKER
Filed July 1, 1920 16 Sheets-Sheet 7
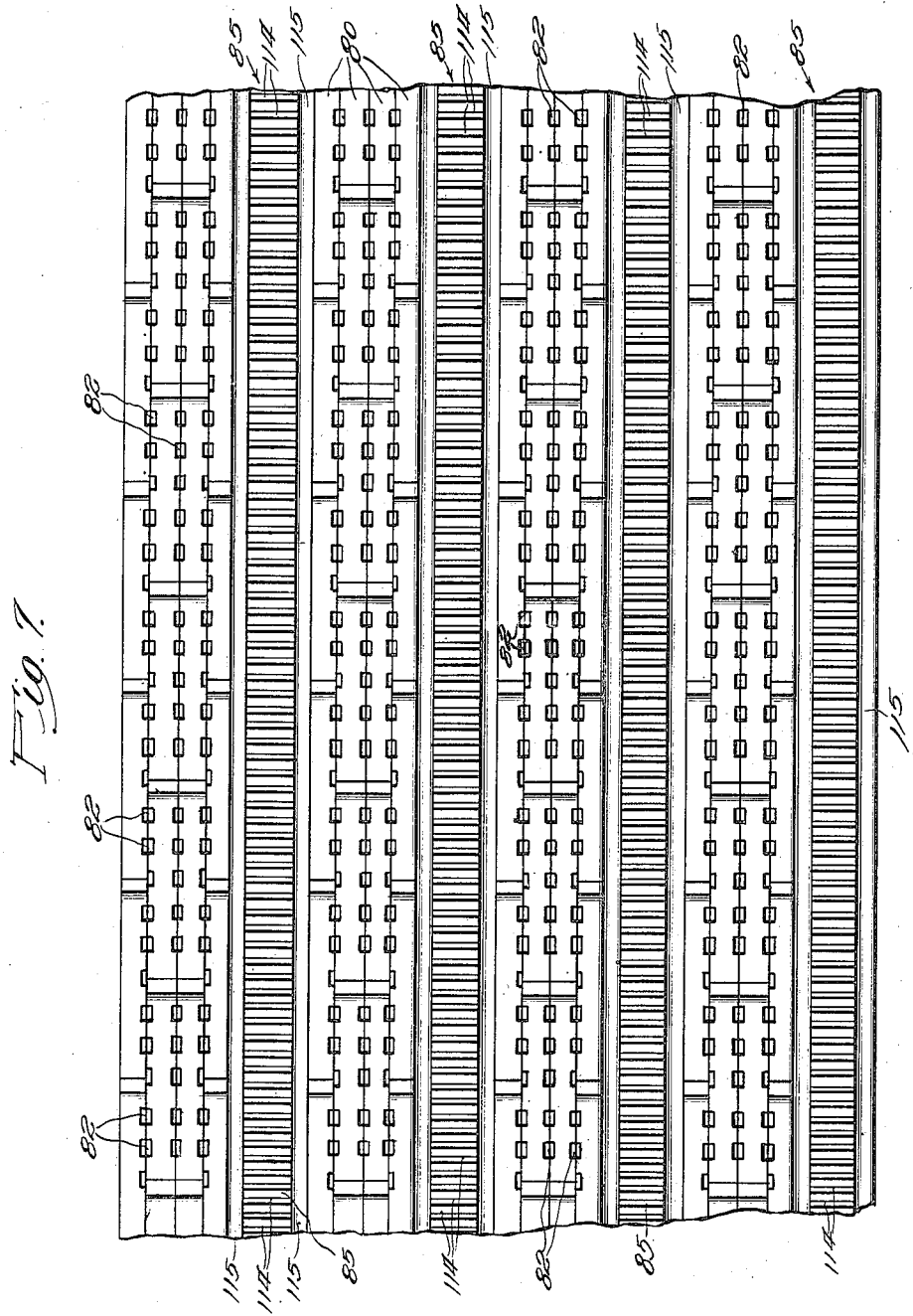

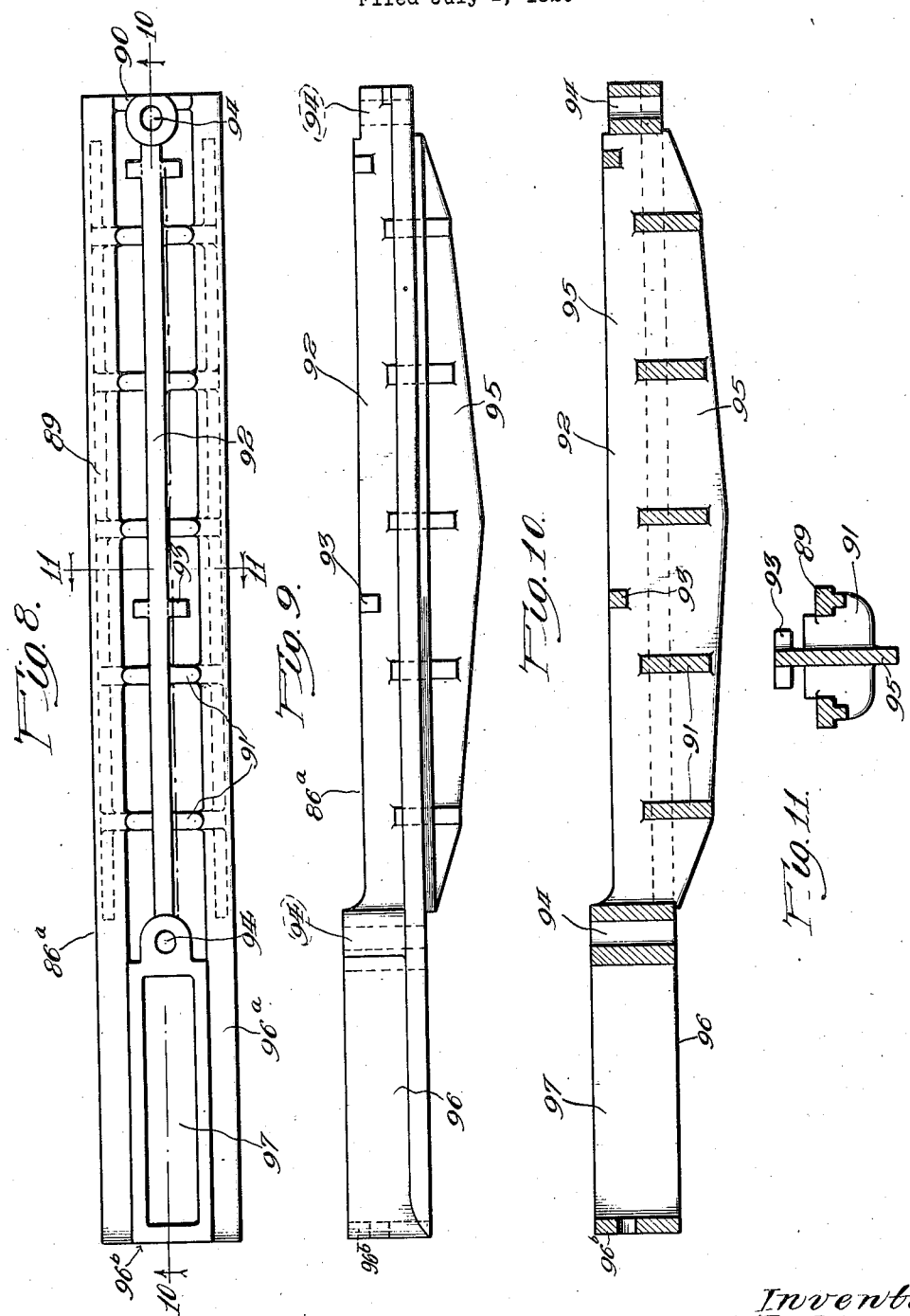

Jan. 6, 1925.  
L. R. STOWE  
STOKER  
Filed July 1, 1920   16 Sheets-Sheet 9

1,521,914

Witness:
Stephen T. Rebora

Inventor.
Loyd R. Stowe.
by Sheridan, Jones, Sheridan & Smith,
Attys.

Jan. 6, 1925.
1,521,914
L. R. STOWE
STOKER
Filed July 1, 1920  16 Sheets-Sheet 10
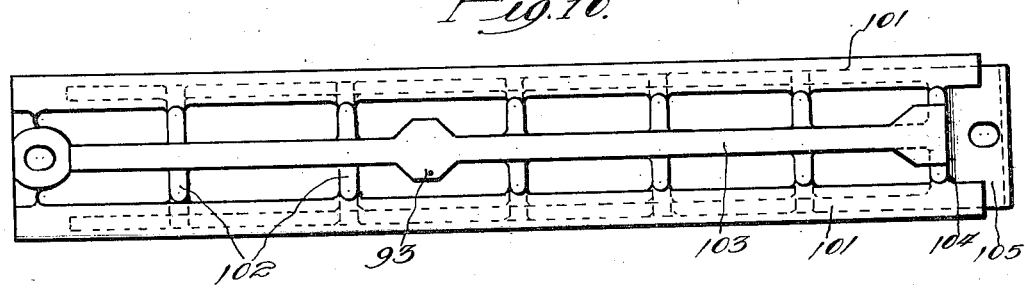
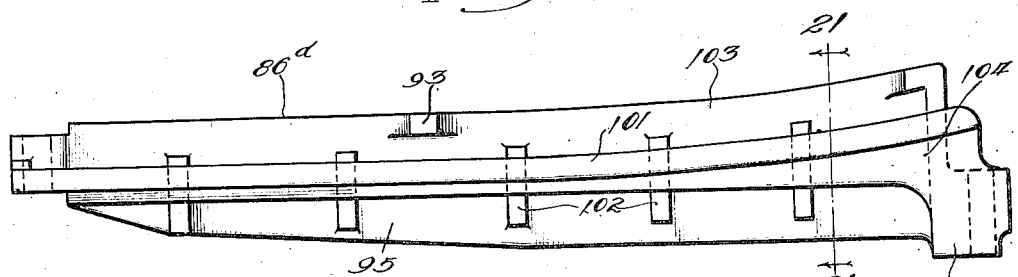
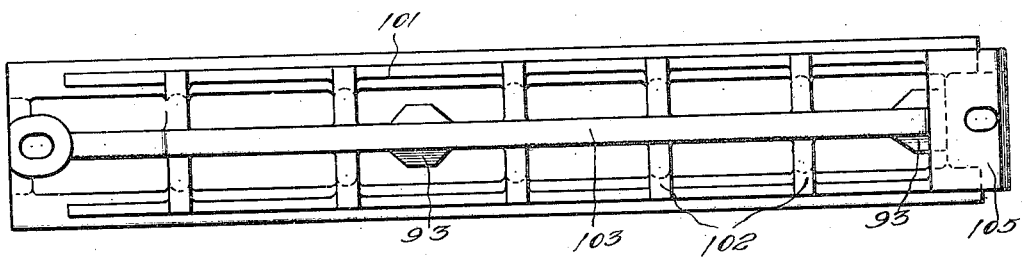
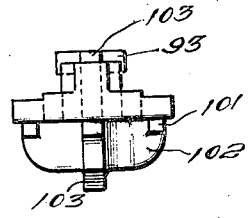 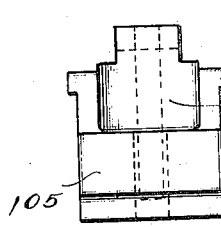 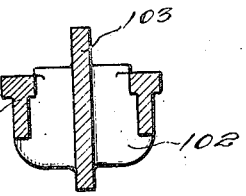
Witness:
Inventor.
Loyd R. Stowe.

Jan. 6, 1925.
L. R. STOWE
STOKER
Filed July 1, 1920     16 Sheets-Sheet 11
1,521,914
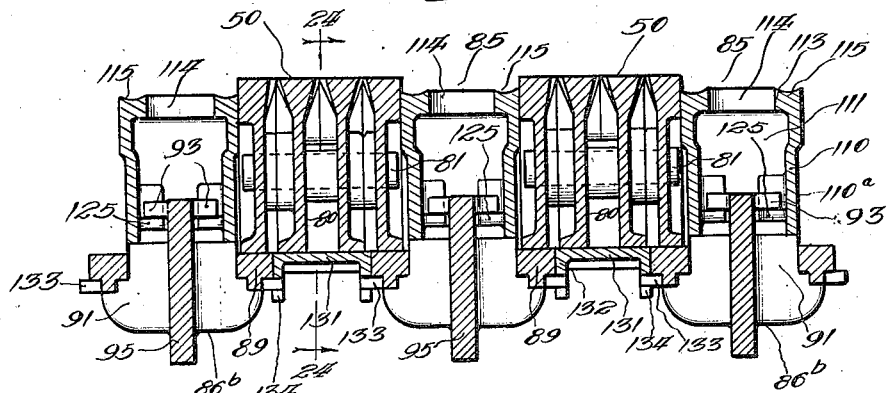
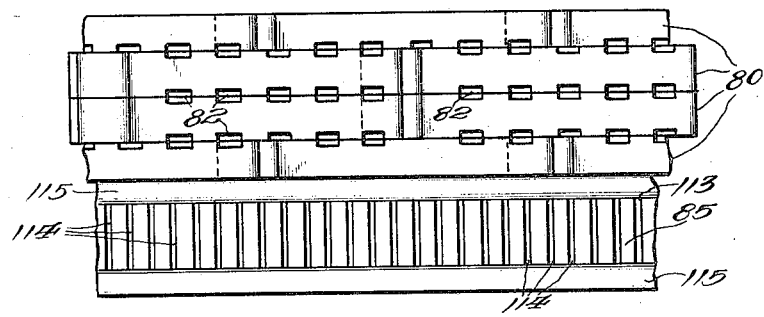
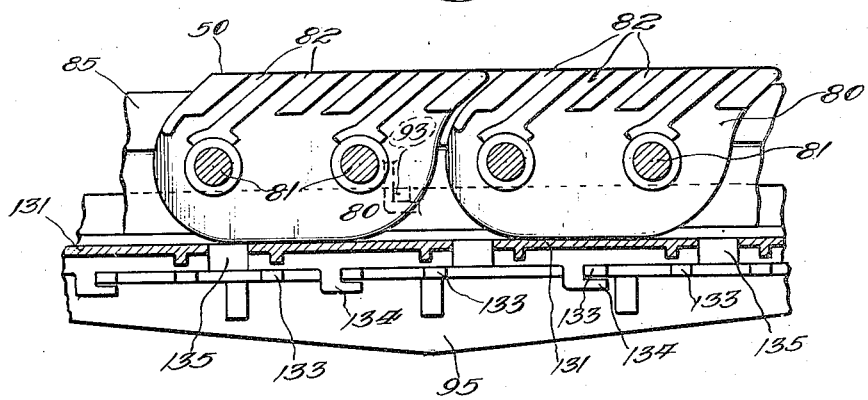
Inventor.
Loyd R. Stowe.

Jan. 6, 1925.
L. R. STOWE
STOKER
Filed July 1, 1920
1,521,914
16 Sheets-Sheet 12
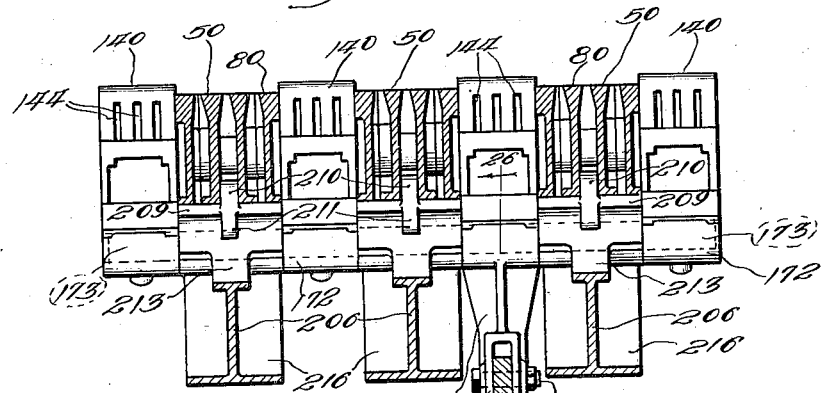
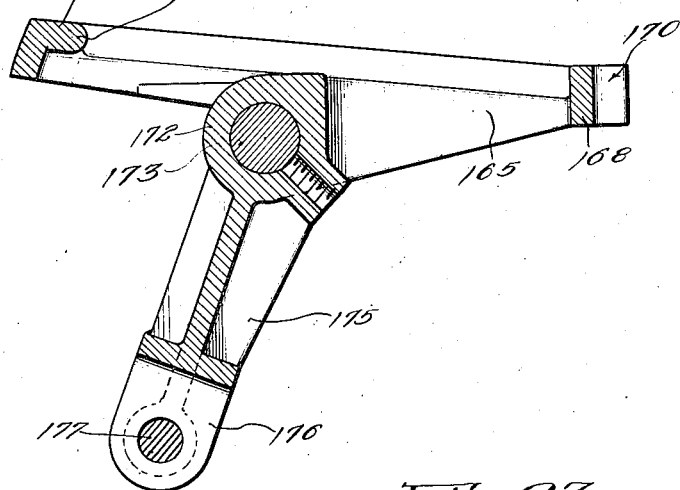
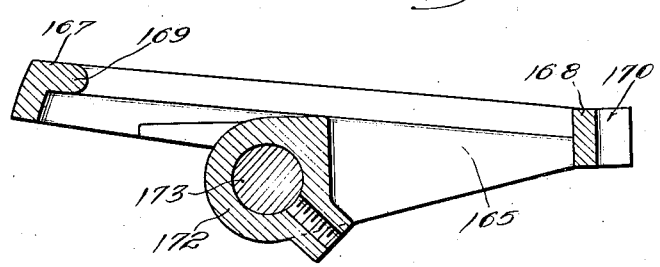
Witness:
Inventor:
Loyd R. Stowe.
by Sheridan, Jones, Sheridan & Smith
Attys.

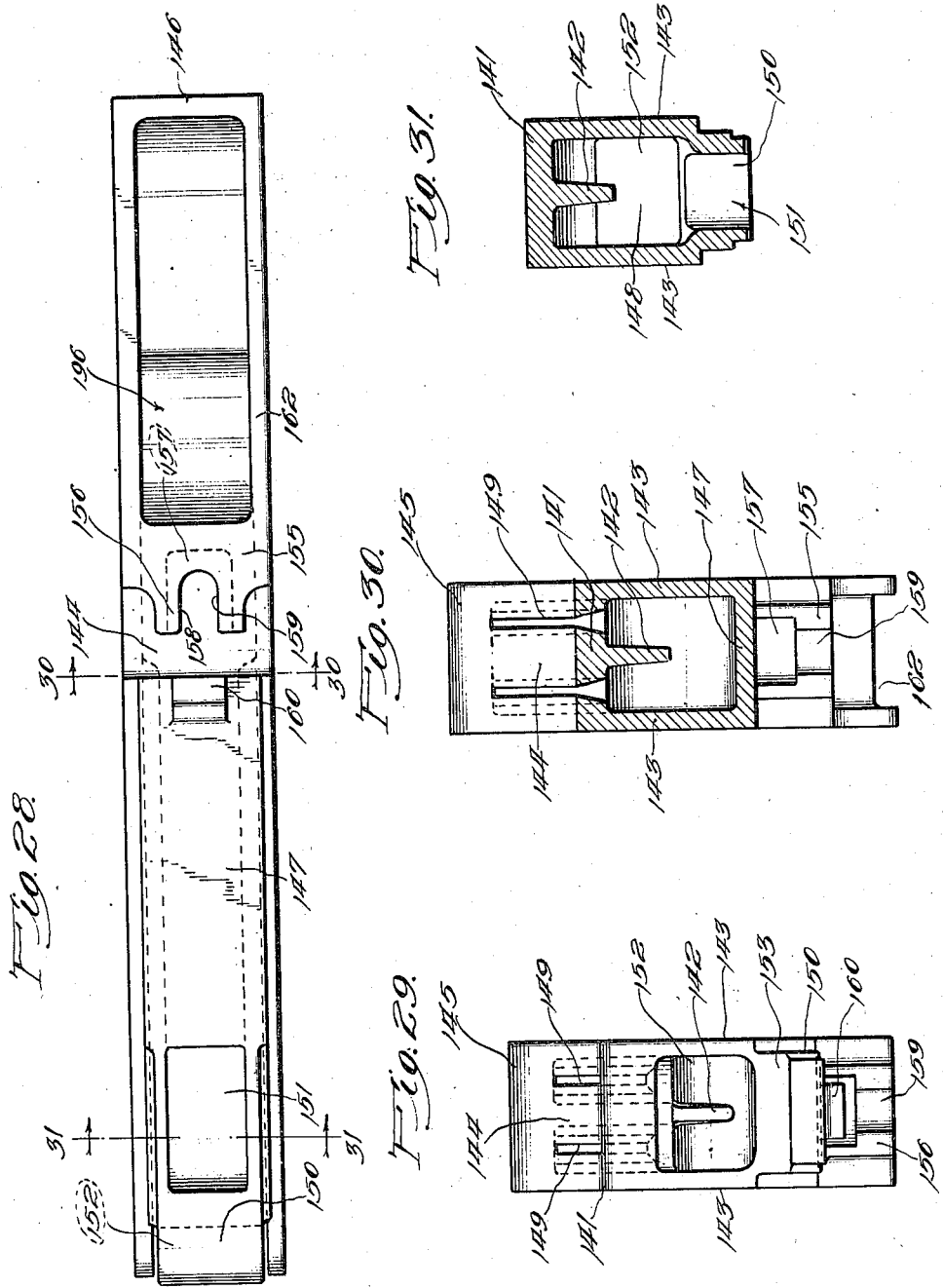

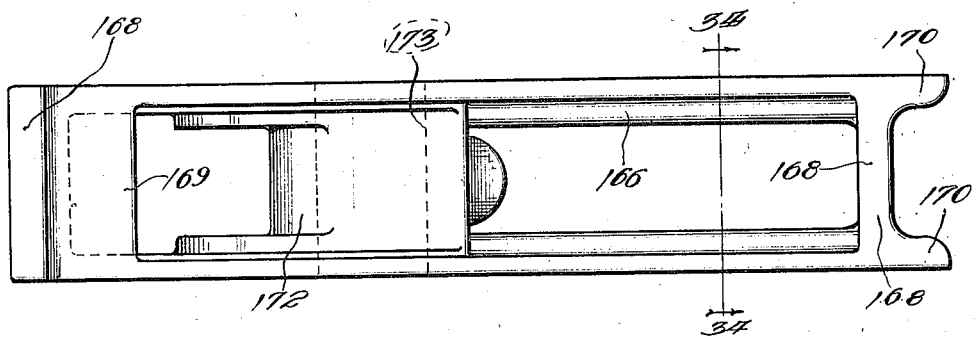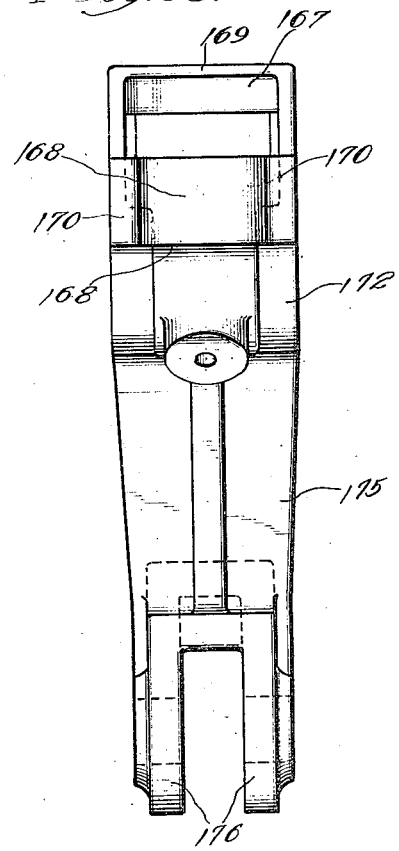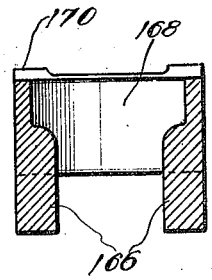

Jan. 6, 1925. 1,521,914
L. R. STOWE
STOKER
Filed July 1, 1920 16 Sheets-Sheet 15
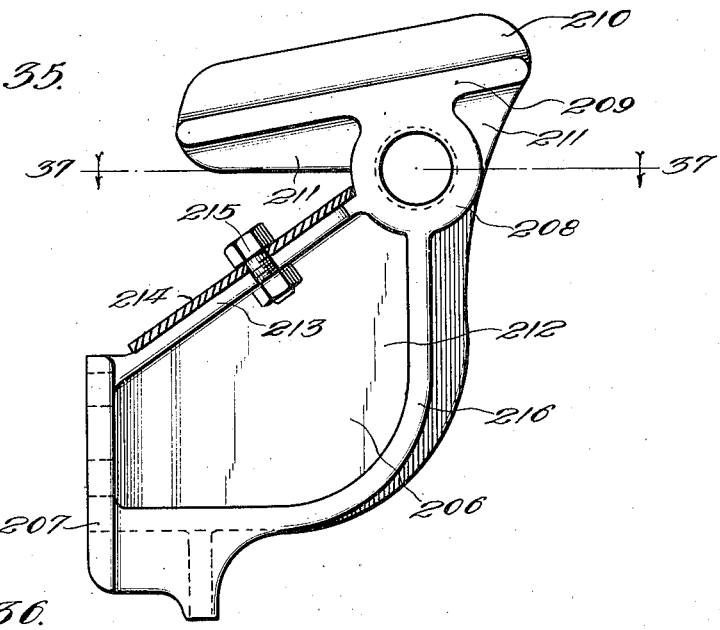
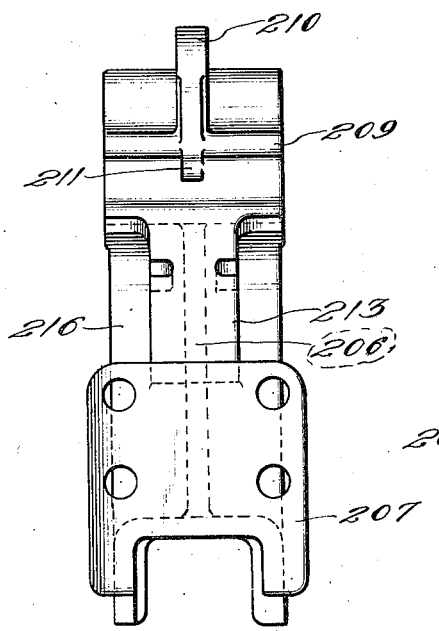
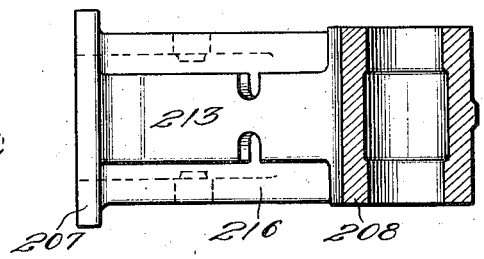
Inventor:
Loyd R. Stowe.

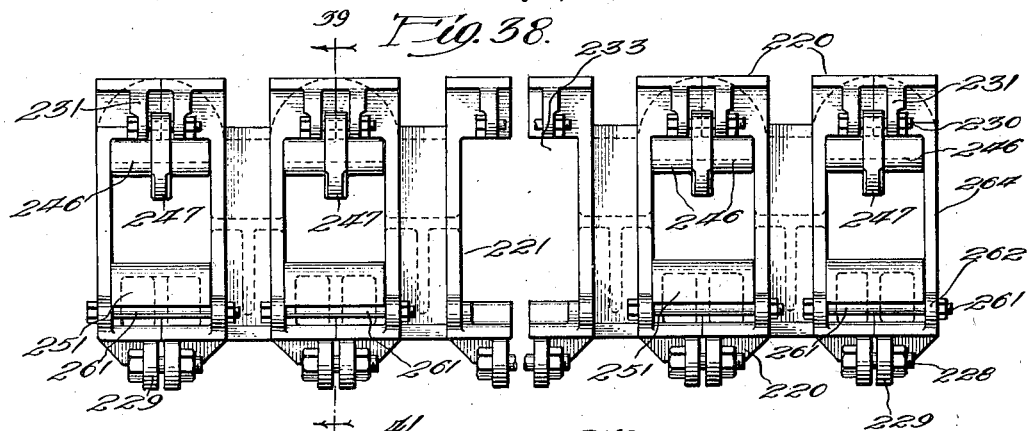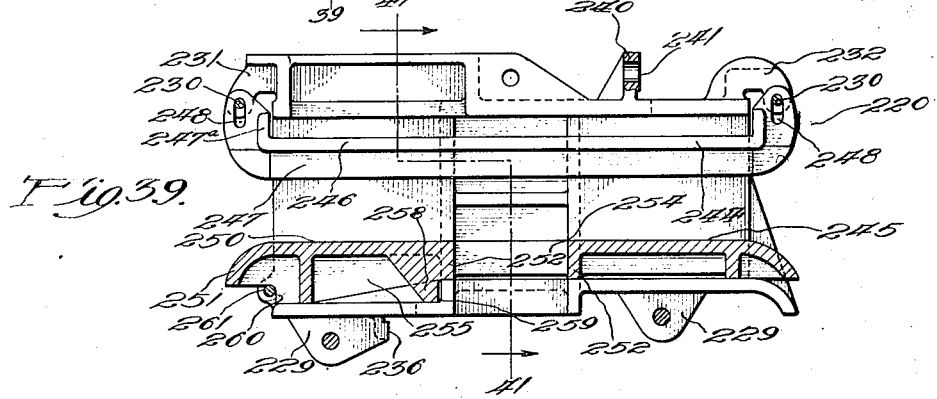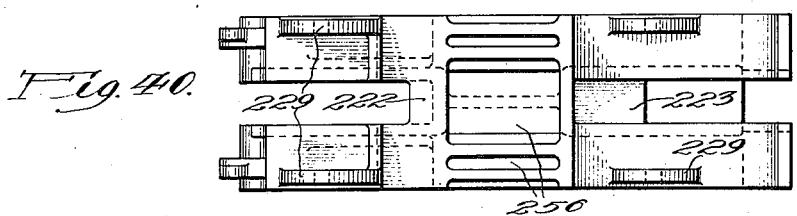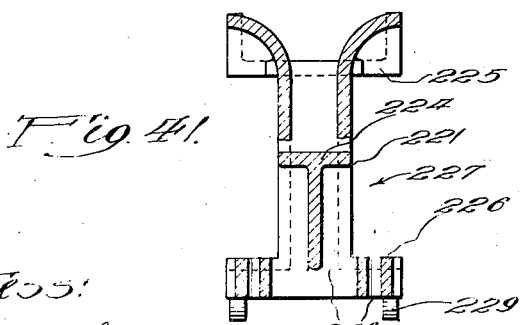

Patented Jan. 6, 1925.

1,521,914

UNITED STATES PATENT OFFICE.

LOYD RICHARD STOWE, OF ST. LOUIS, MISSOURI.

STOKER.

Application filed July 1, 1920. Serial No. 393,265.

*To all whom it may concern:*

Be it known that I, LOYD RICHARD STOWE, a citizen of the United States, residing at 5611 Enright Avenue, St. Louis, in the State of Missouri, have invented certain new and useful Improvements in Stokers, of which the following is a specification.

This invention relates to improvements in stokers for boiler furnaces and the like and its purpose is to provide a device capable of more convenient operation and of effecting a more efficient combustion of the fuel.

In the operation of stokers it has been found that the tendency for the formation of clinkers and the amount and distribution of air necessary for a proper combustion of the fuel vary according to the fuel being used. More particularly it has been found that it is important to vary the air supply in different parts of the area of the grate in order to effect an even burning of the fuel and a complete combustion thereof before it reaches the discharge end of the grate. These results are brought about in the present invention by grate mechanism adapted to maintain the positive feed of the fuel and to permit the desired regulation and variation of the flow of air through the grate in different parts of the grate area.

An important feature of this improved stoker is the combination of movable chain grate elements with stationary or non-progressive grate bars, each of which is located between two of the chains. These grate bars are preferably in the form of blocks containing tuyères through which a part of the air necessary for the combustion of the fuel is fed upwardly through the grate. A further object of the invention is to provide a sectional construction of these tuyères or tuyère-blocks which permits replacement and interchangeability thereof in order to vary the air spaces of the tuyère blocks to suit the fuel being burned and to effect the proper distribution of the air throughout the area of the fuel bed. A further important object of the invention is to provide movable tuyère-blocks or grate bar sections located preferably toward the lower end of the grate, these tuyère block-sections being capable of being elevated into the fuel bed for the purpose of retarding the fuel and building up the fuel bed adjacent the discharge end of the grate.

The stoker of the present invention embodies a sectional construction which permits the extension thereof laterally to any desired width. The movable grate bar elements in different sections of the grate area are arranged to be operated in groups by suitable actuating mechanism controlled from the outside of the furnace so that the grate bar elements in any selected area of the grate may be adjusted to secure the desired degree of thickening or retardation of the fuel.

A further important feature of the invention is the provision of improved means for feeding air to the underside of the grate and sealing the lower end of the grate to prevent leakage of air therethrough from the compressed air chamber to the ash pit or around the lower end of the grate. This is accomplished by providing sealing devices for closing the spaces around the lower return stretches of the movable chains and there is combined with the sealing devices an intermediate atmospheric air chamber which prevents the leakage of air from the compressed air chamber to the ash pit from which it might otherwise leak into the furnace and carry heat from the furnace space resulting in a furnace loss.

Other objects and advantages of the invention, as well as those above set forth, will be more fully understood from a study of the following specification taken with the accompanying drawings in which one embodiment is illustrated.

In the drawings:—

Figure 1 shows a longitudinal sectional view through the walls of a boiler furnace showing a side elevation of my improved stoker;

Fig. 2 shows a transverse sectional view on the line 2—2 of Fig. 1 looking in the direction of the arrows;

Fig. 3 shows a longitudinal sectional view on the line 3—3 of Fig. 2, the lower run of chain and a portion of the front run thereof being broken away for clearness;

Fig. 4 shows an enlarged sectional view similar to that of Fig. 3, showing only the upper portion of the grate and the operating mechanism associated therewith, the chains being omitted for the sake of clearness;

Fig. 5 shows an enlarged longitudinal section on the line 3—3 of Fig. 1, this view being a continuation of Fig. 4 and illustrating only the lower portion of the grate;

Fig. 6 shows a transverse sectional view on the line 6—6 of Fig. 3 looking in the direction of the arrows;

Fig. 7 shows an enlarged plan view of a portion of the grate surface;

Fig. 8 shows an enlarged plan view of one of the sectional tuyère-block supports used in the upper part of the grate;

Fig. 9 shows a side elevation of the tuyère-block supports illustrated in Fig. 8;

Fig. 10 shows a longitudinal sectional view on the line 10—10 of Fig. 8;

Fig. 11 shows a transverse sectional view on the line 11—11 of Fig. 8;

Fig. 16 shows a top plan view of one of the sectional supports for the stationary tuyère-blocks adjacent the lower end of the grate;

Fig. 17 shows a side elevation of the tuyère-block support illustrated in Fig. 16;

Fig. 18 shows a bottom plan view of the tuyère-block support illustrated in Fig. 16;

Fig. 19 shows an end elevation of the tuyère-block support looking toward the right, as viewed in Fig. 16;

Fig. 20 shows an end elevation of the tuyère-block support, looking toward the left in Fig. 16;

Fig. 21 shows a sectional view of the tuyère-block support on the line 21—21 of Fig. 17;

Fig. 22 shows an enlarged transverse sectional view on the line 22—22 of Fig. 4, showing the construction of the tuyère-block sections and the chains mounted between them, shutters which control draft through the chain grate links being shown in position;

Fig. 23 shows a plan view of a chain and one of the tuyère-block sections illustrated in Fig. 22;

Fig. 24 shows a longitudinal sectional view on the line 24—24 of Fig. 22;

Fig. 25 shows a transverse sectional view on the line 25—25 of Fig. 5;

Fig. 26 shows a longitudinal sectional view on the line 26—26 of Fig. 25, illustrating the construction of one of the actuating brackets by which the lower movable tuyère-block sections are supported;

Fig. 27 shows a longitudinal sectional view similar to Fig. 26, illustrating another form of supporting bracket employed to support the other movable tuyère-block sections in the same group with the one supported by the bracket illustrated in Fig. 26, each group of brackets being actuated by a single bracket of the form illustrated in Fig. 26;

Fig. 28 shows a bottom view of one of the rocking tuyère-blocks employed at the lower end of the grate;

Fig. 29 shows an end elevation of one of the rocking tuyère-blocks, looking toward the right, as viewed in Fig. 28;

Fig. 30 shows a vertical section through the rocking tuyère-blocks on the line 30—30 of Fig. 28;

Fig. 31 shows a section through one of the tuyère-blocks on the line 31—31 of Fig. 28;

Fig. 32 shows a top plan view of one of the supports for the rocking tuyère-blocks;

Fig. 33 shows an end elevation of the rocking tuyère-block support illustrated in Figs. 26 and 32;

Fig. 34 shows a sectional view on the line 34—34 of Fig. 32;

Fig. 35 shows a side elevation of one of the brackets by which the rocker shafts of the movable tuyère-blocks are supported;

Fig. 36 shows an end elevation of the bracket illustrated in Fig. 35;

Fig. 37 shows a sectional view on the line 37—37 of Fig. 35;

Fig. 38 shows an end elevation of a group of sealing devices by which the spaces around the lower stretches of the movable chains are closed;

Fig. 39 shows a longitudinal sectional view on the line 39—39 of Fig. 38;

Fig. 40 shows a top plan view of the devices illustrated in Fig. 39; and

Fig. 41 shows a transverse sectional view on the line 41—41 of Fig. 39.

Figure 12:
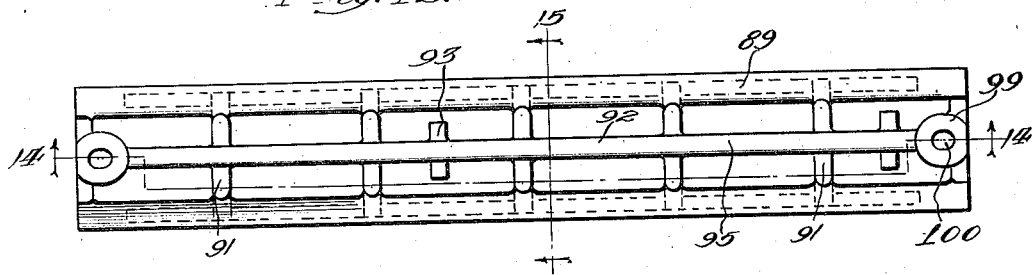
Fig. 12 shows a top plan view of one of the intermediate sectional tuyère-block supports.
Figure 13:
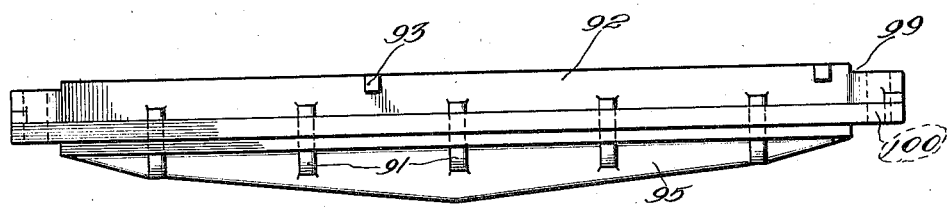
Fig. 13 shows a side elevation of the tuyère-block support illustrated in Fig. 12.
Figure 14:
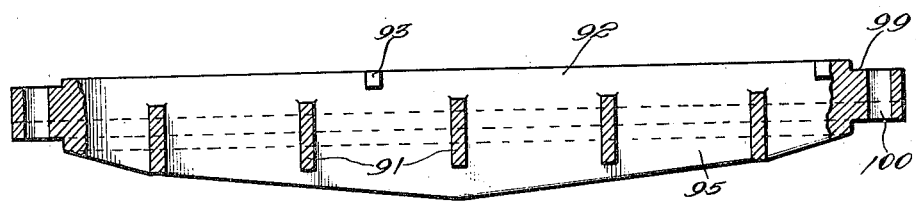
Fig. 14 shows a longitudinal sectional view on the line 14—14 of Fig. 12.

As illustrated in the drawings, the stoker comprises a grate designated generally by the numeral 30. This grate is mounted in an inclined position between the side walls 31 of the furnace and beneath the furnace arch 32, these parts forming the combustion chamber 33 which is closed at its rear end by the upwardly extending bridge wall 34. The stoker is supported between the side walls of the furnace by a concrete foundation 35 which has a conduit 36 therethrough for supplying compressed air to the air supply chamber 37 located beneath the grate. The compressed air chamber 37 is separated by the air sealing mechanism, hereinafter described, from the ash pit 38 into which the ash is discharged through the lower end of the grate. The intermediate portion of the foundation 35 has a channel 39 extending therethrough and communicating with the atmosphere to form an equalizing chamber 40 which constitutes a part of the mechanism for preventing the flow of compressed air from the chamber 37 to the ash pit 38. Fuel is supplied to the grate 30 from a hopper 41 having an inclined lower wall 42 and a vertically movable gate 43 by which the discharge opening of the hopper is regulated.

The supporting structure of the grate and its actuating mechanism comprises two side frames 44 and one or more center frames 45, the number of the center frames depending upon the width to which the grate is extended. The side frames preferably rest directly upon the foundation of the stoker and are formed in sections 44$^a$, 44$^b$, and 44$^c$. The center frame is similarly formed in a number of complementary sections 45$^a$, 45$^b$, and 45$^c$, which are secured together. The lower section 45$^c$ rests directly on the foundation, as illustrated in Fig. 3 and the upper sections 45$^a$ and 45$^b$ are supported by posts 46 which extend downwardly to the foundation.

The side frames 44 and the center frame 45 have fixed therein at their lower ends a transverse shaft 48 upon which are journalled a plurality of idler wheels 49 spaced apart and adapted to support the grate chains 50. These grate chains are mounted at their upper ends on sprocket gears 51 which are secured to a driving shaft 52. This shaft is journalled in bearings 53 supported by the side frames and a bearing 54 supported by the center frame. The bearings 53 are adapted to slide in slots 55 which are formed in the upper portions 44$^a$ of the frame members and they are connected to screw threaded adjusting rods 56 which engage plate 57 on the front wall of the furnace. The outer ends 56$^a$ of these rods may be operated to adjust the positions of the bearings 53 and thereby regulate the degree of tension in the chains 50. The intermediate bearing 54 is supported on a curved support 58 formed on the center frame and is adapted to be moved thereon by another screw threaded adjusting rod 59 which extends outwardly through the front wall of the stoker.

In the embodiment illustrated, the driving mechanism is connected to each end of the shaft 52. This driving mechanism comprises a pair of large driving gears 60 which are secured to the shaft and driven by pinions 61 fixed on an intermediate shaft 62. This shaft 62 is journalled in bearings 63 carried by the side frames 44, and is actuated by a gear 64 secured to one end thereof. This gear is in turn driven by a pinion 65 secured on a shaft 66 which is journalled in bearings 67 carried by the side frames.

The shaft 66 has a ratchet wheel 68 secured thereon and adapted to be actuated by a pawl 69 mounted on an oscillatory arm 70 which is pivoted on the shaft. This arm may be oscillated by any desired mechanism in order to rotate the ratchet wheel. The reverse rotation of the ratchet wheel is prevented by a pivoted detent 71. A housing 72 is secured to the side frame and incloses the upper portion of the gearing mechanism at the side of the stoker. One end of the shaft 66 extends through the housing 72 and is provided with a squared portion 73 which may be engaged by a wrench to permit the manual operating of the chains for purposes of adjustment when desired. At the other side of the stoker the shaft 66 is provided with a pulley 74 which is connected through a belt 75 to another pulley 76, mounted on the lower shaft 77. This lower shaft is journalled in bearings 78 carried by the side frame members and is adapted to actuate the movable grate bar elements in the manner hereinafter described.

Each grate chain 50 is made up of four series of links 80. These links are arranged side by side with those of the two outer series overlapping those of the two inner series, and these overlapping links are connected by pivot pins 81 in order to form a flexible grate element. The links 80 are provided with grooves 82 therethrough to form air spaces through which air passes from the chamber 37 into the fuel bed. The adjacent surfaces of the two inner rows of links are cut away on their undersides to form openings for the teeth of the idler wheels 49 and the gears 51, heretofore described, and these teeth coact with bushings mounted on the pivot pins 81 during the travel of the chains. The chains 50 are located between the grate bars or tuyère-blocks 85 through which air is supplied to the fuel bed. These grate bars are formed in sections 85$^a$, 85$^b$, 85$^c$, 85$^d$, 85$^e$, 85$^f$, and are carried by the supports 86 which are also formed in sections 86$^a$, 86$^b$, 86$^c$, and 86$^d$. The upper sections 85$^a$ of the grate bars are in the form of dead-plates adapted to lie beneath the outlet of the fuel hopper but the remaining sections 85$^b$, 85$^c$, 85$^d$, etc. are constructed in the form of tuyère-blocks adapted to permit the passage of air therethrough. The sections of the tuyère-block supports are supported by transverse I-beams 87 to which they are secured by bolts 88. The beams 87 rest upon the intermediate center frame 45 and are connected at their ends to the side frames 44. The sections of the tuyère-block supports are generally similar in construction but vary slightly in design in different parts of the grate area. The upper sections 86$^a$ are of the form illustrated particularly in Figs. 8, 9, 10, and 11, where it will be seen that each member comprises side bars 89 connected by the end members 90 and by transverse webs 91. A central rib 92 is carried by the webs 91 midway between the side members 89 and projects upwardly above the side members, being provided with laterally extending lugs 93 through which an interlocking connection is made with the tuyère-block section 85ª. Apertures 94 are provided through the sectional tuyère-block and dead-plate support 86ª to receive the bolts 88. Reinforcing flanges 95 are formed on the underside of the side walls 89 to prevent downward bending of the tuyère-block support. It will be observed that the section 86ª comprises a forwardly projecting part 96 which extends above the upper I-beam 87. This projecting portion comprises side walls 96ª and an end wall 96ᵇ with an intermediate opening 97 between them. The next adjacent sections 85ᵇ and 85ᶜ of the tuyère-block supports are of the form illustrated in Figures 12, 13, 14, and 15, each of these parts being substantially similar to the section 86ª without the upward extension 96. The central web 92 of each sectional support 86ᵇ and 86ᶜ has lugs 93 projecting therefrom and is carried by the transverse webs 91 which are formed integrally with the side walls 89. The ends of the sections 86ᵇ and 86ᶜ are provided with projections 99 having apertures 100 therethrough to receive the bolts 88. The lowermost section 86ᵈ of each tuyère-block support is generally similar to the other members, as shown in Figs. 16 to 21 inclusive, except that it is curved upwardly toward its lower end to conform to the general upward curvature of the chains and of the frame members at the lower end of the grate, which curvature is provided in order to effect a retardation of the fuel for the purpose of building up the fuel bed adjacent the bridge wall. The side walls 101 of each section 86ᵈ are formed integrally with the transverse webs 102 which extend laterally from the central rib 103. This central rib is formed at its lower end with an end wall 104 having an apertured lug 105 projecting therefrom to rest upon the transverse channel member 106 to which it is secured by a bolt 108.

Figure 15:
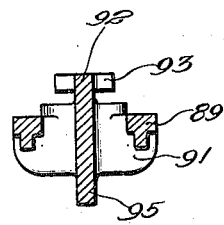
Fig. 15 shows a transverse sectional view on the line 15—15 of Fig. 12.

The transverse ribs 91 of the tuyère-block supports extend slightly above the lateral walls 89 of these members, as illustrated particularly in Fig. 15, and these ribs are adapted to support the dead-plate and tuyère-block sections 85ª, 85ᵇ, 85ᶜ, etc. The tuyère-block sections comprise side walls 110 which extend upwardly above the ribs 91 and these side walls are united by a plurality of inclined webs or plates 111 which are curved in cross section and increased in thickness toward their upper edges, as illustrated in Figs. 4 and 5. The intervening openings 112 thus flare downwardly and the inclination of the webs or plates taken in combination with the inclination of the grate is adapted to prevent the finer particles of fuel from dropping directly through the grate. The upper ends of the webs or plates 111 form parts of the upper walls 113 of the tuyère-block sections and the openings 112 between the webs form continuations of the openings 114 which are formed through the upper wall. The upper wall is provided along its lateral edges with longitudinal grooves 115 which are adapted to catch the fine dust of the fuel and prevent the entrance thereof into the spaces between the tuyère-block sections and the adjacent chains 50. The side walls 110 are slightly recessed in the lower parts thereof, as shown at 110ª in order to provide some clearance between the tuyère-block sections and the chains except in the immediate region of the upper grate surface. The tuyère-blocks 85 may be formed in any desired number of sections which are detachably secured to the tuyère-block supports. The uppermost grate bar sections 85ª which lie immediately beneath the discharge opening of the fuel hopper comprise solid upper walls 117 extending between side walls 118 and these walls are united adjacent the upper ends by a downwardly extending plate 119 which is secured to the upper end wall 96ᵇ of the adjacent tuyère-block support by means of a bolt 120. Each tuyère-block section is provided at its lower end with a projecting lug or flange 122 which is adapted to underlie a projecting tongue 123 formed on the upper end of the next adjacent section. In addition to this interlocking means the side walls 110 and 118 of the grate bar sections are provided with downwardly extending hooks 125 adapted to interlock with the lugs 93 formed on the tuyère-block supports. These hook members 125 are passed into position by a downward movement of the tuyère-block section and they serve to support all of the tuyère-block sections against movement due to the contact of the chains and the fuel therewith. Some slight lateral movement of the tuyère-block sections may be permitted in order to compensate for some irregularity in the construction and movement of the chains. The lowermost stationary tuyère-block section is similar to the others except that it is curved upwardly to conform to the contour of its support, as shown in Fig. 5.

With the exception of the upper and lower sections, all of the tuyère-block sections are adapted to be interchanged with each other and the upper and lower sections can be replaced with others having different air spaces, the difference in the air spaces being effected by changing the sizes of the openings 114 and the spaces 112. These openings are in fact varied by changing the thickness of the webs 111 at their upper edges and in Figs. 3, 4, and 5 it will be observed that the webs 111 gradually increase in thickness at their upper edges from the upper part of the grate to the lower end thereof with the result that an increased supply of air is permitted to flow through the upper portion of the grate as compared with the amount of air permitted to pass through the lower part of the grate. This general arrangement is adapted to offset the conditions present in normal stoker operation whereby there is a natural tendency for a greater flow of air to pass through the lower part of the grate. These tuyère-block sections may be interchanged with each other or with other tuyère-block sections in order to secure any desired condition of air supply in different parts of the grate or to suit any character of fuel.

The ledges 89 forming the side walls of the tuyère-block supports are adapted to support the links of the chains 50 which slide thereover. The outer edges of the chains at the lateral edges of the furnaces are supported by similar ledges 130 which are formed on the side walls 44 see Figs. 2–6. The upper stretches of the chains are thus firmly supported throughout the length of the grate. The openings between the side walls or ledges 89 of adjacent tuyère-block supports are adapted to permit air to pass upwardly through the air spaces formed in the links of the chains and the supply of air permitted to flow through these passages may be regulated by a number of detachable shutters 131 which are adapted to fit between the ledges 89, as illustrated in Fig. 22. These shutters have downwardly extending side walls 132 which are adapted to rest upon the lugs 133 which extend outwardly from the ledges 89. Hooks 134 are formed on the side walls of the shutters and are adapted to underlie the lugs 133 in order to hold the shutters in position. The shutters are of such size that when placed in position with their hook members 134 engaging the lugs 133, as illustrated in Fig. 24, the ends of adjacent shutters beneath one chain are spaced apart to form intervening spaces 135. When all of the shutters 131 are in position beneath a chain, the openings 135 are the only ones which permit a flow of air upwardly through the chains. The amount of air flow through the chains may be regulated by removing some of the shutters 131 or by interchanging them with others of different length.

At the lower end of the grate the spaces between the chains are occupied by movable grate bar elements or rocking tuyère-blocks 140. These rocking tuyère-blocks have the form illustrated particularly in Fig. 5 and comprise an upper flange 141 which extends upwardly and forwardly from the lower ends of the stationary tuyère-blocks 85. The flange or plate 141, shown in Fig. 30, is reinforced on its underside by a rib or cooling vein 142 and is connected at its edges with the side walls 143. At a point substantially above the shaft 48 by which the lower ends of the chains are supported, the upper wall 141 of the rocking tuyère-block curves upwardly, as shown at 144, and terminates in a projecting horn or shoulder 145. From the horn 145 the upper wall of the rocking tuyère-block curves downwardly and rearwardly, as shown at 146, and conforms substantially to the contour of the upper surfaces of the grate chains.

The side walls of each rocking tuyère-block are united by a curved lower wall 147 which extends from the rear curved wall 146 in a forward direction, following the curvature of the upper wall 141. A channel 148 is thus formed through the tuyère-block and this channel is adapted to communicate with the vertically extending slots or openings 149 which are formed through the curved portion 144 of the upper wall adjacent to the horn 145. The side walls 143 are united at their forward ends by a transverse tongue 150 and the lower wall 147 terminates rearwardly of this tongue leaving an intervening opening 151 through which air can pass from the region beneath the grate through the passage 148 and the openings 149 into the fuel bed. Another opening 152 is also provided between the forward end the upper wall 141 and the transverse web 150 in order to permit an additional flow of air into the passage 148 of the rocking tuyère-block. The forward ends of the side walls 143 are notched out and the tongue 150 is projected forwardly, thus forming a recess 153 by which a connection is formed between the tuyère-block and its support. The lower wall 147 is provided with other connecting means located beneath the horn 145 and comprising a downwardly extending boss 155 which has two forwardly extending flanges or walls 156 formed thereon and united by a lower flange 157. The lower flange is cut away to form a U-shaped slot 159 and a depending lug 160 is formed integrally with the lower wall directly opposite the slot 159. These parts are adapted to be engaged by interlocking devices hereinafter described. A reinforcing rib 162 extends rearwardly from the boss 155 to the lower portion of the wall 146.

The rocking tuyère-blocks 140 are carried by supporting members 165, each of which comprises side walls 166 spaced apart and united by integral end walls 167 and 168. The forward end wall 167 is carried rearwardly to form a hook 169 which is adapted to enter the recess 153 formed in the forward end of the tuyère-block carried thereby.

The rear end wall 168 has flanges 170 projecting rearwardly from the sides thereof and these flanges are adapted to extend on opposite sides of the walls 156 which project from the boss 155 with the depending lug 160 engaging the forward side of the wall 168. In this way each rocking tuyère-block is securely interlocked with its support. This interlocking connection is supplemented by a bolt 171 engaging the U-shaped slot 159. All of the supports 165 are provided with hubs 172 which are formed integrally with the side walls and adapted to be supported by a rocker shaft 173. The hubs are secured to the rocker shaft by set screws 174 engaging threaded apertures in the hubs. A number of rocker shafts 173 are arranged in alignment across the furnace, the number of such shafts depending upon the width of the grate, and in the embodiment illustrated there are four rocking tuyère-blocks carried by each shaft.

Each group of tuyère-blocks mounted on one rocker shaft is actuated through mechanism connected to a rocker arm 175 which is formed integrally with one of the supports 165. Each rocker arm 175 is provided at its lower end with depending ears 176 having an enlarged or elongated opening engaged by a pin 177 through which a connection is formed with a sliding connecting rod 178. Each connecting rod 178 extends forwardly through an aperture in the channel beam 106, previously described, and engages a tubular guiding and sealing member 179 which is secured to the channel beam. This tubular member is provided with a downwardly and rearwardly inclined forward end 180 in order to prevent the entrance of dust and ashes into the spaces around the rod 178. Each rod 178 is further supported by a series of tubular guide members 181 which are secured to the lower flanges of the I-beams 87 by which the stationary tuyère-blocks are supported. A clamp 182 is secured to each rod 178 adjacent its forward end and this clamp is pivotally connected to a connecting rod 183. The forward end of the connecting rod is pivotally connected to an intermediate lever 184 by means of a pin 185 engaging any desired one of the apertures 186 which are formed through the intermediate member. The upper end of the intermediate member is pivoted at 187 on an adjusting rod 188 which is adapted to slide in brackets 189 secured to the forward I-beam 87. This adjusting rod is connected to a plate 191 which passes through a slot in the wall 190 of the furnace. The plate 191 is provided with rack teeth 192 on its underside and these teeth are adapted to be engaged by a toothed segment 193 which is pivoted on a bracket 194 formed integrally with the wall 190. This toothed segment is actuated by a lever 195 in order to slide the plate 191 longitudinally and thereby adjust the position of the pivotal point 187 through the movement of the adjusting rod 188. The adjusting rod may be secured in position by a pin 196, engaging one of the apertures in the plate 191, and an aperture in the flange 197, which is formed on the metal wall 190. Doors 198 are provided through the forward wall 190 for clinkering purposes. The intermediate member 184 is rocked about the pivot 187 in order to actuate the rod 178 and thereby rock the tuyère-blocks 140, through the operation of an eccentric 200, which is secured to the shaft 77, previously referred to. An eccentric strap 201 is mounted on this eccentric and has an arm 202 extending therefrom and pivotally connected to the intermediate member 184 at the point 203. It will be understood that there are several (as many as are required for the width of the grate) eccentrics 200 mounted on the shaft 77, each eccentric being adapted to actuate its respective group of rocking tuyère-blocks. The degree of movement of the tuyère-blocks in each group can be regulated from the forward end of the furnace by adjusting the lever 195 and thereby varying the position of the pivotal axis 187. In this way the rocking tuyère-blocks in any selected area of the grate can be independently adjusted to secure any desired movement in the fuel bed in order to break up the formation of clinkers or in order to retard the progress of the fuel and build up the fuel bed adjacent the bridge wall.

The outer ends of the rocker shafts 173 at the sides of the grate are journalled in bearings 205 formed in the side frames 44, as shown in Figure 1. All of the intermediate bearings between the side frames are formed in brackets 206 having the form illustrated particularly in Figures 35, 36 and 37. One of these brackets 206 is located in the space between each pair of chains and they are all provided with vertical flanges 207 by means of which they are secured to the transverse channel beam 106, as shown in Fig. 5. Each bracket has a hub 208 in which the rocker shaft 173 is journalled and this hub carries on the upperside thereof a plate 209 over which the adjacent grate chain 50 is adapted to slide. An upwardly extending rib 210 is formed on each plate 209 to engage the groove on the inner side of the chain and prevent an undue leakage of air therethrough. The plate 209 is reinforced on its underside by ribs 211. Each bracket comprises a plate 212 extending between the vertical flange 207 and the hub 208. An inclined flange 213 is formed along the upper edge of the plate 212 and a sheet metal plate 214 is seated on the flanges 213 of the brackets and secured thereto by bolts 215. This plate extends throughout the width of the grate and is constructed to close the spaces between the shaft 173 and the channel beam 106 in order to prevent the flow of air from the region beneath the grate bars toward the ash pit. Each bracket 206 is reinforced on its lateral sides by ribs 216.

The flow of air toward the ash pit around the lower stretches of the flexible grate chains 50 is prevented by a sealing device comprising a plurality of air seal casings 220 of the form illustrated particularly in Figures 5, 38, 39, 40 and 41. Each casing 220 has a pair of longitudinal vertical walls 221 which are spaced apart and united by the connecting walls 222, 223 and 224. The vertical walls 221 are flared outwardly along their upper edges and have right angularly disposed upper walls 225 formed integrally therewith. Lower walls 226 extend outwardly from the vertical walls 221, thus leaving recesses 227 on opposite sides of each casing. These casings are adapted to fit together, as shown in Figure 38, and are secured together by means of bolts 228, engaging the ears 229, formed integrally with the lower walls, and other bolts 230 engaging ears 231 and 232, formed integrally with the upper portions of the casings. The recesses 227 of adjacent casings thus cooperate with each other to form rectangular openings 233 through which the lower stretches of the grate chains are adapted to pass. These casings 220 are adapted to rest upon the concrete abutment 235, which extends upwardly from the foundation and contains the equalizing chamber 40, previously referred to. The depending ears 229 of the casings are embedded in the concrete and the shoulders 236 formed along the rear edges of the forward members 229 are adapted to coact with a metallic channel beam 238 which is embedded in the concrete and which is secured at its ends to brackets 239 formed on the inner sides of the side frames 44. The transverse channel beam 106 by which the brackets 206 are carried is also connected to the side frames at its ends and it rests upon the upper walls of the casings 220, as shown in Figure 5. Each casing 220 has an upwardly extending lug 240 formed on the upper side thereof and these lugs are provided with apertures 241 to receive bolts whereby they are secured to the channel beam 106. The lateral edges of the grate chains 50 are adapted to engage somewhat closely the vertical walls 221 which form the lateral boundaries of the openings 233 and the upper and lower surfaces of the chains are adapted to engage movable shoes 244 and 245, respectively. Each upper shoe 244 comprises a flat plate 246 having a longitudinal rib 247 formed thereon to engage the central groove on the inner side of the grate chain. The ends of the shoe 244 are turned upwardly and are provided with elongated slots or openings 248 which are engaged by the pins or bolts 230, previously described. The slots 248 permit the shoes 244 to ride freely upon the chains and the upturned portions 247ª of the upper walls prevent the flow of air through the casings 220 between the upper walls 225 and the plates 246 Each lower shoe 245 comprises a longitudinal plate 250 which is adapted to engage the lower or outer surface of the grate chain and this plate 250 is curved downwardly at its ends, as shown at 251, in order to permit the chain to ride freely thereover in either direction. A series of transverse ribs 252 extend downwardly from the plate 250 and rest upon the lower wall of the casing 220. In the central portion of the shoe 245 a rectangular opening 254 is provided between two of the ribs 252 and between the longitudinal ribs 255 which extend beneath the plate 250. This opening 254 is adapted to permit the flow of air therethrough to the equalizing chamber 40, the communication with this chamber being formed by a series of elongated openings 256 which are formed through the lower walls of the casings 220, as shown in Figures 40 and 41. Each shoe 245 is retained in position by means of a downwardly extending lug 258 engaging the shoulder 259 on the casings and by the other shoulders 260 formed at the forward ends of the ribs 255 which are adapted to engage pins 261 mounted in the ears 262 formed on the side walls of the casings 220. The shoe 245 is thus not rigidly attached but is retained in position by gravity and in the event of any irregularity in the movement of the chains, the lug 258 may break off or the pins 261 may sheer off under unusual stress in order to permit the movement of the shoe with the chain and thus prevent injury to the casings 220. At the sides of the furnace, the series of casings 220 is completed by two half casings 264 of the form illustrated in Figure 38. After passing through the air seal casings 220, the chains 50 are supported by a series of tubular rollers 265 which are journalled at their ends in bearings carried by the side frames 44 and the center frame 45.

It has been determined through experimentation and practice that with certain types of fuel varying amounts of air are required in different parts of the grate area in order to effect an efficient and proper combustion of the fuel. In some furnaces there is a tendency for the fuel bed to burn thin toward the discharge end of the grate, thus permitting an increased flow of air through this portion of the grate and decreasing the amount of air flowing through the upper portion of the grate. These difficulties and many others are overcome in the operation of the present invention. The grate of the stoker is preferably arranged at an angle of about 20° to the horizontal, although this angle may vary under different conditions, and the lower end of the grate is curved upwardly so that the progress of the fuel over the grate is retarded adjacent the bridge wall, thus tending to increase the thickness of the fuel bed adjacent the bridge wall due to the curvature of the grate alone. The movable chains located between the grate bars serve to impart a positive feed to the fuel and this advantage is obtained without causing the fuel bed to burn thin adjacent the bridge wall. The action of the curvature of the grate in retarding the fuel is supplemented by the action of the movable grate bars or tuyère-blocks located at the discharge end of the grate. The action of these rocking bars is to raise the clinker away from the positive conveying action and then to lower the spent fuel on to the chains so that it can be conveyed intermittently over the lower end of the grate. The elevation of the movable grate bars serves to retard the fuel and build up the thickness of the fuel bed at the lower end of the grate. By regulating the movement of the rocking bars with respect to the upper surfaces of the upper stretches of the chains, it is possible to obtain any desired degree of retardation and of the positive conveying action in different parts of the lower portion of the grate. The interchangeable stationary tuyère-blocks permit an arrangement of these members for allowing the desired flow of air in any area of the grate and this regulation which is possible through the interchangeability of the tuyère-blocks can be supplemented by regulating the amount of air which passes upwardly through the grate chains, since the removable shutters may be taken out entirely or replaced by others of different length in order to vary the air spaces between the tuyère-block supports. This regulation of the flow of air through the grate is accomplished without reducing the air pressure and a high velocity of the air flow is maintained through the grate at all points. This is of great advantage in preventing the burning of the grate bars and chains.

The air seal at the lower end of the grate effectively prevents the flow of air from the compressed air chamber to the ash pit or around the lower end of the grate and at the same time the construction of the rocking tuyère-blocks permits the flow of air to the fuel bed at the extreme lower end thereof. The casings and movable shoes which engage the lower stretches of the chains substantially close the passages through which any air leakage may occur and it is found in practice that this air leakage is further materially reduced by the provision of the intermediate equalizing chamber 40 in which the air is at atmospheric pressure. The pressure of the air in the ash pit is usually but slightly below atmospheric pressure so that there is little danger of the leakage of air from the intermediate air seal casings 220. The pressure in the compressed air chamber, which may be as high as two inches water column, for example, may cause a small amount of air to leak through the forward part of the air sealing device into the region of the equalizing chamber but this leakage passes out through the equalizing chamber and causes no loss in the furnace.

Although I have shown and described one form of the invention for purposes of illustration, it will be understood that it may be constructed in various other forms without departing from the scope of the appended claims.

I claim:

1. The combination in a stoker, of a plurality of grate chains spaced apart, a plurality of stationary sectional tuyère bars each interposed between two of said chains, said tuyère bars and said chains being mounted in inclined position with the lower parts thereof having less inclination to the horizontal than the upper parts thereof, means for actuating said chains to feed the fuel downwardly of said grate and means for actuating the end sections of said tuyère bars at the lower ends of said chains to retard the progress of the fuel.

2. The combination in a stoker of a plurality of grate chains spaced apart, a plurality of rows of tuyère blocks each located in the space between two of said chains, and means for regulating the amount of air permitted to pass through said chains without affecting the draft through said blocks.

3. In combination, a grate structure comprising spaced endless chains, a fuel supply located above said grate and arranged to feed fuel downwardly thereon, stationary partitions located between said chains, said partitions being formed of a plurality of tuyère blocks having passages therethrough and with their upper surfaces adjacent the surfaces of said chains, said blocks being interchangeable with similar blocks provided with different sized passages whereby the passage of air may be controlled in any stationary portion of said grate, and removable means to vary the flow of air through said chains.

4. In combination, a grate structure comprising spaced endless chains, rows of block members located between said chains, said block members having upper fuel supporting surfaces apertured for passage of air and substantially coplanar with the adjacent fuel supporting surfaces of said grate chains, fuel supply means located above said grate, and imperforate bars located in each of said rows beneath said fuel supply means.

5. The combination in a stoker of a plurality of movable grate chains spaced apart, a plurality of stationary apertured blocks located between said chains and extending from the forward end of the grate throughout a portion of its length, a plurality of movable blocks located between said chains adjacent the rear end of the grate and forming continuations of said stationary blocks, and means for actuating said movable blocks.

6. The combination in a stoker of a plurality of movable grate chains spaced apart, a plurality of rows of stationary tuyère-blocks each row located between two of said chains and extending throughout a portion of the length of said grate, a plurality of movable tuyère blocks located adjacent the discharge end of the grate and forming continuations of said rows of stationary tuyère-blocks, and means for actuating said movable tuyère blocks.

7. The combination in a stoker of a plurality of grate chains spaced apart, a plurality of rows of stationary tuyère-blocks each row located in the space between two of said chains, said stationary tuyère-blocks being removable and interchangeable and having air spaces differing in size extending therethrough, means for supporting said tuyère-blocks, said stationary tuyère-blocks extending from the forward end of the grate for a substantial portion of its length, and movable tuyère-blocks located between said chains adjacent the rear end of the grate to form continuations of said each row of stationary tuyère-blocks.

8. The combination in a stoker of a plurality of grate chains spaced apart, a plurality of stationary apertured bars each located in the space between two of said chains, said stationary bars being formed in removable and interchangeable sections, means for supporting said sections, and movable blocks located between said chains adjacent the rear end of the grate to form continuations of said stationary bars.

9. The combination in a stoker of a plurality of grate chains spaced apart, a plurality of rows of stationary tuyère-blocks each located in the space between two of said chains, said stationary tuyère-blocks extending throughout a portion of the length of the grate, a plurality of movable tuyère-blocks forming continuations of said rows of stationary tuyère-blocks adjacent the rear end of the grate, said movable tuyère-blocks being mounted in groups, and means for independently actuating the separate groups of movable tuyère-blocks.

10. The combination in a stoker of a plurality of grate chains spaced apart, a plurality of rows of stationary tuyère-blocks each located in the space between two of said chains, said stationary tuyère-blocks extending throughout a portion of the length of the grate, a plurality of movable tuyère-blocks forming continuations of said rows of stationary tuyère-blocks adjacent the rear end of the grate, said movable tuyère-blocks being mounted in groups, means for independently actuating the separate groups of movable tuyère-blocks, and means controlled from the forward end of the stoker for regulating the degree of movement with respect to said chains of the tuyère-blocks in each group.

11. The combination in a stoker of a pair of said frames, a plurality of endless grate chains supported by said side frames and spaced apart, transverse supporting beams extending between said side frames beneath the upper stretches of said chains, a plurality of tuyère-block supports carried by said transverse beams, a plurality of tuyère-blocks mounted on said supports and occupying the spaces between said chains, and means carried by said tuyère-block supports for regulating the amount of air permitted to pass through the upper stretches of said chains.

12. The combination in a stoker of a pair of side frames, a plurality of endless grate chains supported by said side frames and spaced apart, transverse supporting beams extending between said side frames beneath the upper stretches of said chains, a plurality of tuyère-block supports carried by said transverse beams, a plurality of tuyère-blocks mounted on said supports and occupying the spaces between said chains, and a plurality of detachable shutters carried by said tuyère-block supports and adapted to regulate the amount of air permitted to pass upwardly between said tuyère-block supports and through said chains.

13. The combination in a stoker of a pair of side frames, a center frame located between said side frames, a plurality of endless grate chains carried by said side frames and said center frame and spaced apart, transverse beams extending between the upper and lower stretches of said chains and supported by said side frames and said center frame, a plurality of stationary tuyère-blocks carried in rows by said beams between said chains, and a plurality of movable tuyère-blocks carried by one of said beams and forming continuations of said stationary tuyère-block rows.

14. The combination in a stoker of a pair of side frames, a center frame located between said side frames, a plurality of endless grate chains carried by said side frames and said center frame and spaced apart, transverse beams extending between the upper and lower stretches of said chains and supported by said side frames and said center frame, a plurality of stationary tuyère-blocks carried in rows by said beams between said chains, a plurality of rocker shafts supported by one of said beams, a plurality of movable grate bar elements mounted on each of said rocker shafts, each of said movable grate bar elements forming a continuation of one of said tuyère-block rows, and means for actuating said rocker shafts.

15. The combination in a stoker of a plurality of endless grate chains spaced apart, a plurality of stationary grate elements each located in the space between two of said chains, and extending from the forward end of the grate for a substantial portion of its length, and a plurality of movable grate elements located between said chains adjacent the rear end of the grate, said movable grate elements being mounted in groups, and means for independently actuating each group of grate elements.

16. The combination in a stoker of a plurality of transverse supporting beams, a plurality of apertured supporting members mounted on said beams in parallel relation, a plurality of hollow apertured fuel supporting tuyère-blocks open on their under sides and detachably mounted on said supporting members, and a plurality of grate chains adapted to travel in the spaces between said tuyère-blocks, the upper surfaces of said tuyère-blocks being provided with longitudinal grooves along their lateral edges.

17. The combination in a stoker of a pair of movable grate chains spaced apart, and a fuel supporting tuyère mounted between said chains and having longitudinal grooves in its upper surface adjacent its lateral edges.

18. The combination in a stoker of a plurality of endless grate chains spaced apart, and a plurality of movable grate bar elements each located between two of said chains at the discharge end of the grate, said grate bar elements each comprising an upper wall extending from its forward end and terminating in an upturned horn and a rear wall extending from said horn and conforming generally to the curvature of the rear portions of said grate chains.

19. The combination in a stoker of a plurality of endless grate chains spaced apart, and a plurality of movable grate bar elements each located between two of said chains at the discharge end of the grate, said grate bar elements each comprising an upper wall extending from its forward end and terminating in an upturned horn and a rear wall extending from said horn and conforming generally to the curvature of the rear portions of said grate chains, said grate bar elements having air passages opening therein at their forward ends and discharging therefrom on their upper sides forwardly of said horns.

20. The combination with a stoker comprising a grate of a compressed air chamber beneath said grate, an ash pit adjacent the discharge end of said grate, and means comprising an equalizing chamber for preventing the flow of air from said compressed air chamber through said stoker into said ash pit.

21. The combination in a stoker of a plurality of endless grate chains, a compressed air chamber beneath said chains for discharging air upwardly through the grate, an ash pit adjacent the lower end of said grate, and means comprising an intermediate atmospheric air chamber for preventing the flow of air from said compressed air chamber to said ash pit through the spaces around the lower stretches of said chains.

22. The combination in a stoker of a plurality of endless grate chains, a plurality of air seal casings through which the lower stretches of said chains are adapted to pass adjacent the rear end of the grate, means for closing the space between the upper portions of said casings and the upper stretches of said chains, and an atmospheric air chamber communicating with an intermediate portion of each of said air seal casings.

23. The combination in a stoker of a plurality of endless grate chains, a plurality of air seal casings extending across the stoker and having openings therein through which the lower stretches of said chains are adapted to pass, movable shoes adapted to engage the upper and lower surfaces of said chains within said casings, an air chamber located adjacent said casings, said casings and said shoes having passages therethrough to permit communication between said chamber and the intermediate portions of said openings.

24. The combination in a stoker of a plurality of endless grate chains, a plurality of air seal casings extending across the stoker and having openings therein through which the lower stretches of said chains are adapted to pass, movable shoes adapted to engage the upper and lower surfaces of said chains within said casings, an air chamber located adjacent said casings, said casings and said shoes having passages therethrough to permit communication between said chamber and the intermediate portions of said openings, and means for closing the spaces between the upper portions of said casings and the upper stretches of said chains.

25. The combination in a stoker of a plurality of endless grate chains, a plurality of air seal casings extending across the stoker and having openings therein through which the lower stretches of said chains are adapted to pass, movable shoes adapted to engage the upper and lower surfaces of said chains within said casings, an air chamber located adjacent said casings, said casings and said shoes having passages therethrough to permit communication between said chamber and the intermediate portions of said openings, a transverse supporting beam extending transversely of the stoker immediately above said casings, brackets carried by said beam, grate bars carried by said brackets and located between said chains, and a plate extending transversely of the stoker on said brackets for closing the spaces between said beam and the upper stretches of said chains.

26. A grate structure comprising endless travelling chains spaced apart and parallel, rows of stationary members mounted between said chains, said members being provided with laterally projecting portions and said chains being slidably mounted on said portions, said chains being apertured to permit passage of air therethrough, and shutter members attachable to and detachable from said laterally projecting portions of said stationary members beneath said chains.

In testimony whereof, I have subscribed my name.

LOYD RICHARD STOWE.